US011614541B2

(12) United States Patent
Jia

(10) Patent No.: US 11,614,541 B2
(45) Date of Patent: Mar. 28, 2023

(54) LASER BEAM CONTROL IN A LIDAR SYSTEM

(71) Applicant: Analog Devices, Inc., Norwood, MA (US)

(72) Inventor: Kemiao Jia, Tolland, CT (US)

(73) Assignee: Analog Devices, Inc., Norwood, MA (US)

(*) Notice: Subject to any disclaimer, the term of this patent is extended or adjusted under 35 U.S.C. 154(b) by 812 days.

(21) Appl. No.: 16/570,538

(22) Filed: Sep. 13, 2019

(65) Prior Publication Data
US 2021/0080584 A1    Mar. 18, 2021

(51) Int. Cl.
H04B 10/00   (2013.01)
G01S 17/88   (2006.01)
G02B 26/10   (2006.01)
G01S 7/481   (2006.01)
G02B 27/30   (2006.01)
G02B 27/16   (2006.01)

(52) U.S. Cl.
CPC ............ *G01S 17/88* (2013.01); *G01S 7/4817* (2013.01); *G02B 26/10* (2013.01); *G02B 27/16* (2013.01); *G02B 27/30* (2013.01)

(58) Field of Classification Search
CPC . H04B 10/112; H04B 10/1123; H04B 10/114; H04B 10/1143; H04B 10/1149; H04B 10/40; G01S 7/4817; G01S 17/42; G01S 17/10; G01S 17/89; G01S 17/88; G01S 7/4814; G02B 26/10; G02B 27/30

USPC ....... 398/169, 170, 118, 119, 127, 128, 129, 398/130, 131, 135, 136, 158, 159; 356/4.01, 5.01, 3.01, 4.1
See application file for complete search history.

(56) References Cited

U.S. PATENT DOCUMENTS

| | | | |
|---|---|---|---|
| 4,957,336 A | 9/1990 | Hasegawa et al. | |
| 5,751,243 A | 5/1998 | Turpin | |
| 5,861,989 A | 1/1999 | Hasegawa et al. | |
| 5,966,223 A | 10/1999 | Amitai et al. | |
| 7,177,020 B2 | 2/2007 | Morioka et al. | |
| 7,583,364 B1 | 9/2009 | Mayor et al. | |
| 7,995,088 B2 | 8/2011 | Iwai | |
| 9,812,838 B2 | 11/2017 | Villeneuve et al. | |
| 10,107,914 B2 | 10/2018 | Kaischeur et al. | |
| 11,237,251 B2* | 2/2022 | Bartlett | G01S 7/4814 |
| 2018/0267148 A1* | 9/2018 | Buettner | G01S 17/42 |
| 2019/0003820 A1 | 1/2019 | Van Leeuwen et al. | |
| 2019/0003828 A1 | 1/2019 | Choiniere | |
| 2019/0146060 A1 | 5/2019 | Qiu et al. | |

* cited by examiner

*Primary Examiner* — Hanh Phan
(74) *Attorney, Agent, or Firm* — Schwegman Lundberg & Woessner, P.A.

(57) ABSTRACT

This disclosure describes techniques for operating a lidar device. The techniques include emitting light resulting in a plurality of non-parallel laser beam waves; directing the plurality of non-parallel laser beam waves towards a laser beam scanner; reflecting the non-parallel plurality of beam waves by the laser beam scanner towards a collimator device; collimating, with the collimator device, the plurality of non-parallel laser beam waves reflected by the laser beam scanner into a corresponding plurality of parallel plane waves; and directing the plurality of plane waves from the collimator device towards a field of interest.

20 Claims, 6 Drawing Sheets

LASER BEAM CONTROL IN A LIDAR SYSTEM

FIELD OF THE DISCLOSURE

This document pertains generally, but not by way of limitation, to a light detection and ranging (LIDAR) device.

BACKGROUND

LIDAR is an acronym for light detection and ranging. In general, LIDAR refers to a surveying technology that measures distance information about an object by illuminating the object with laser light, detecting light reflected from the object, and using time-of-flight techniques to resolve the distance to the object based on the known speed of light and the amount of time it takes for the light to travel from the LIDAR system to the object and back. LIDAR can also be used to determine depth and/or speed of the object. A LIDAR system may be seen as a system similar to a sonar system which uses sound waves or a radar system which uses radio waves to measure distances to objects, except that a LIDAR system uses light waves.

Recently, LIDAR systems have been considered by automotive industry for use in vehicles for determining distances to other vehicles or, in general, other objects.

SUMMARY OF THE DISCLOSURE

In some certain embodiments, a system and method are provided for operating a LIDAR device. The lidar device comprises a laser beam source configured to emit light resulting in a plurality of non-parallel laser beam waves; a laser beam scanner; and one or more lenses configured to direct the plurality of non-parallel laser beam waves towards the laser beam scanner, the laser beam scanner being configured to reflect the non-parallel plurality of beam waves towards a collimator device; the collimator device being configured to: collimate the plurality of non-parallel laser beam waves reflected by the laser beam scanner into a corresponding plurality of parallel plane waves; and direct the plurality of plane waves towards a field of interest.

In some implementations, the plurality of non-parallel laser beam waves are spherical waves.

In some implementations, the plurality of non-parallel laser beam waves directed by the one or more lenses converge at different angles at the laser beam scanner.

In some implementations, the laser beam scanner is configured to linearly phase shift the plurality of non-parallel laser beam waves by rotating about an axis of the laser beam scanner.

In some implementations, the collimator device comprises a fixed array of parabolic reflectors with each reflector configured to collimate the laser beam toward one of a plurality of directions.

In some implementations, the collimator device is actively synchronized with the laser beam scanner by changing operation of the collimator device as the laser beam scanner rotates about the axis of the laser beam scanner.

In some implementations, the collimator device comprises an active phase change device comprising a plurality of phase change devices, wherein different sets of the phase change devices are activated to change a refractive index of the phrase change devices as the laser beam scanner rotates about the axis of the laser beam scanner so as to collimate the linearly phase shifted plurality of non-parallel laser beam waves into the corresponding plurality of parallel plane waves, wherein the refractive index of the different sets of the phase change devices is changed using a plurality of electrodes.

In some implementations, the collimator device comprises an active phase change device comprising a layer of phase-change material (PCM) and a plurality of electrodes, wherein different sets of the electrodes are activated as the laser beam scanner rotates about the axis of the laser beam scanner so as to collimate the linearly phase shifted plurality of non-parallel laser beam waves into the corresponding plurality of parallel plane waves.

In some implementations, the collimator device comprises a bendable mirror that actively bends as the laser beam scanner rotates about the axis of the laser beam scanner so as to collimate the linearly phase shifted plurality of non-parallel laser beam waves into the corresponding plurality of parallel plane waves.

In some implementations, a width of the plurality of parallel plane waves represents a distance between a first point of intersection of a perpendicular line with a first of the plurality of parallel plane waves and a second point of intersection of the perpendicular line with a second of the plurality of parallel plane waves, wherein the width is set based on a relative distance between the collimator device and the laser beam scanner.

In some implementations, the width remains constant s the laser beam scanner rotates about an axis of the laser beam scanner.

In some embodiments, a method for operating a lidar device comprises: emitting light resulting in a plurality of non-parallel laser beam waves; directing the plurality of non-parallel laser beam waves towards a laser beam scanner; reflecting the non-parallel plurality of beam waves by the laser beam scanner towards a collimator device; collimating, with the collimator device, the plurality of non-parallel laser beam waves reflected by the laser beam scanner into a corresponding plurality of parallel plane waves; and directing the plurality of plane waves from the collimator device towards a field of interest.

In some implementations, the plurality of non-parallel laser beam waves converge at different angles at the laser beam scanner.

In some implementations, the laser beam scanner is configured to linearly, phase shift the plurality of non-parallel laser beam waves by rotating about an axis of the laser beam scanner.

In some implementations, the collimator device comprises a fixed array of parabolic reflectors with each reflector configured to collimate the laser beam toward one of a plurality of directions.

In some implementations, the method further comprises actively synchronizing the collimator device with the laser beam scanner by changing operation of the collimator device as the laser beam scanner rotates about the axis of the laser beam scanner.

In some implementations, the collimator device comprises an active phase change device comprising a plurality of phase change devices, further comprising activating different sets of the phase change devices to change a refractive index of the phrase change devices as the laser beam scanner rotates about the axis of the laser beam scanner so as to collimate the linearly phase shifted plurality of non-parallel laser beam waves into the corresponding plurality of parallel plane waves, wherein the refractive index of the different sets of the phase change devices is changed using a plurality of electrodes.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes, among other things, techniques for operating a LIDAR device, such as a time-of-flight (TOF) LIDAR device and/or a Coherent LIDAR device. Specifically, the disclosed techniques generate a plurality of non-parallel laser beam waves and direct the waves towards a laser beam scanner. The laser beam scanner reflects the non-parallel waves towards a collimator device to collimate the waves into parallel plane waves. The parallel plane waves are directed towards a field of interest. By directing converging non-parallel laser beam waves towards the laser beam scanner and then collimating diverging non-parallel waves reflected by the scanner into parallel waves, smaller scale laser beam scanners can be employed without sacrificing spatial resolution or signal to noise ratio. This allows the physical space on a device to be reduced while still providing increased spatial resolution and high signal to noise ratio when scanning objects with cross sections smaller than the beam size. Also, by employing smaller scale laser beam scanners, the laser beam scanners can be rotated significantly faster while consuming less power.

Figure 1:
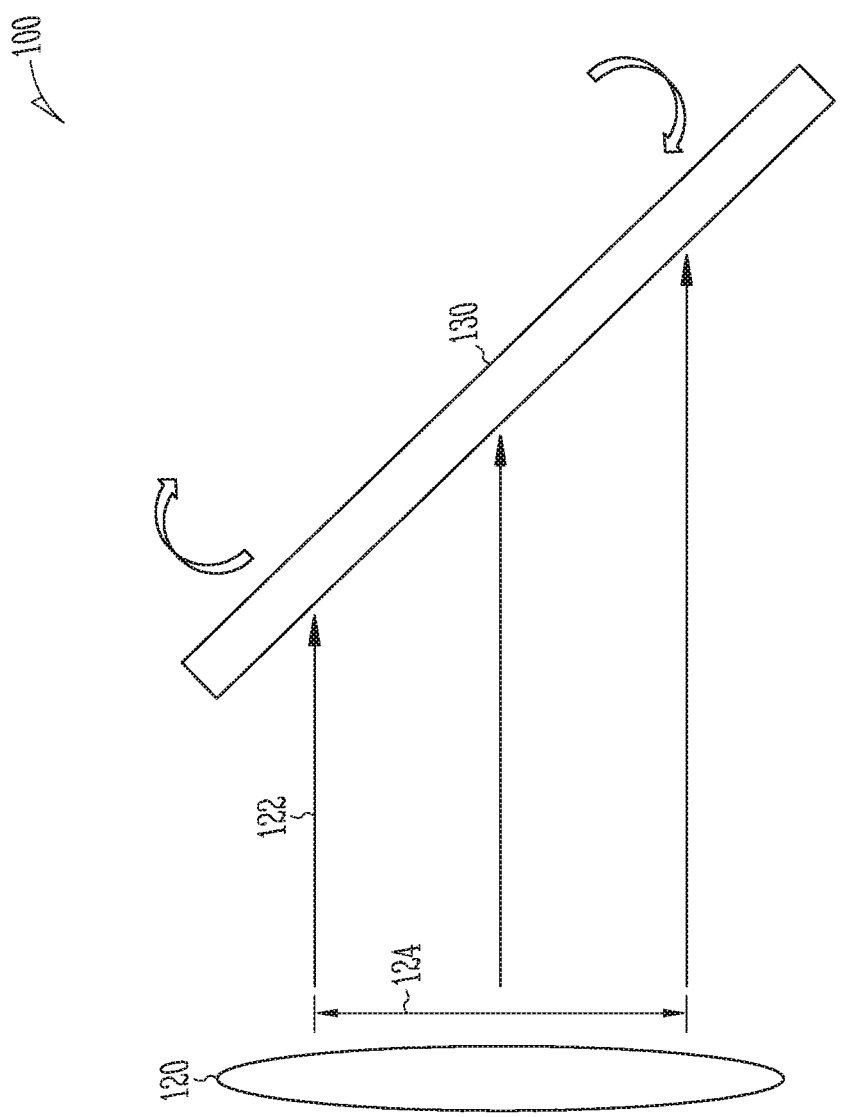
FIG. 1 is a block diagram of an example of a typical laser steering sub-system.

FIG. 1 is a block diagram of an example of a typical laser steering sub-system 100 of a LIDAR device. Specifically, FIG. 1 depicts the laser steering portion of the LIDAR system and for brevity excludes discussion of the laser driving or signal detection portions of the LIDAR system. The laser steering sub-system 100 of the LIDAR device includes a laser beam generator 110, a collimator 120 and a laser beam scanner 130.

The laser steering sub-system 100 operates by emitting a spherical laser light beam 112 from the laser beam generator 110. The laser light beam 112 includes multiple laser beam waves diverging in multiple directions. This laser light beam 112 is directed towards the collimator 120 from the laser beam generator 110. Collimator 120 uses one or more lenses to collimate the diverging laser beam waves into parallel waves 122 which are directed towards the laser beam scanner 130. Laser beam scanner 130 uses one or more mirrors to reflect the parallel waves 122 towards a field of interest. Particularly, the laser beam scanner 130 rotates about its central axis to direct the parallel waves 122 towards the field of interest. Light that bounces off of the field of interest is detected and measured by the laser steering sub-system 100 to determine a distance to the field of interest and/or depth of the field of interest.

The parallel waves 122 that are collimated by the collimator 120 have a width 124 between a first light wave and a second light wave. The scanning resolution of the laser steering sub-system 100 depends on the width 124 between the first and second light waves of the parallel waves 122. In particular, by increasing the width 124, the spatial resolution of the laser steering sub-system 100 can be improved. That is, as the width 124 is increased, smaller objects can be measured by the laser steering sub-system 100 with better signal to noise ratio. While increasing the width 124 of the parallel waves 122 improves the spatial resolution of the laser steering sub-system 100, increasing the width 124 also requires the size of the laser scanner 130 to be increased. This results in a greater amount of physical space to be occupied by the laser scanner 130. Also, using a larger laser scanner 130 slows down the speed at which the scanner 130 can be rotated. In addition, more power is needed to rotate a larger laser scanner 130. This increases the overall complexity and manufacturing costs for implementing such laser steering sub-systems 100 of LIDAR devices.

To address the shortcomings of such approaches, the disclosed techniques increase the size of the width 124 of the parallel waves 122 that are directed towards a field of interest without increasing the size of the laser beam scanner 130. In this way, the physical space on a device and the power consumed by the device are reduced while the spatial resolution of the laser steering sub-system 100 of the LIDAR device is increased. In some embodiments, the disclosed techniques increase the spatial resolution without significantly increasing the size of the laser scanner 130 by directing non-parallel laser beams 122 towards the laser beam scanner 130 and then collimating the non-parallel laser beams 112 reflected by the laser beam scanner 130 into parallel laser beams 122. Specifically, unlike the typical laser steering sub-system 100 which first collimates the non-parallel laser beams 112 into parallel laser beams 122 and then directing the parallel laser beams 122 towards the laser beam scanner 130, the disclosed techniques first direct converging beams towards the laser beam scanner 130 and then collimate diverging beams reflected by the laser beam scanner 130 into parallel beams 122. Namely, because the waves directed towards the laser beam scanner 130 are converging, a smaller scanner can be used to direct the beams towards the field of interest. Also, the width of the parallel beams 122 that are collimated after being reflected by the laser beam scanner 130 can be controlled by the distance between the laser beam scanner 130 and the collimator device 120.

Figure 2:
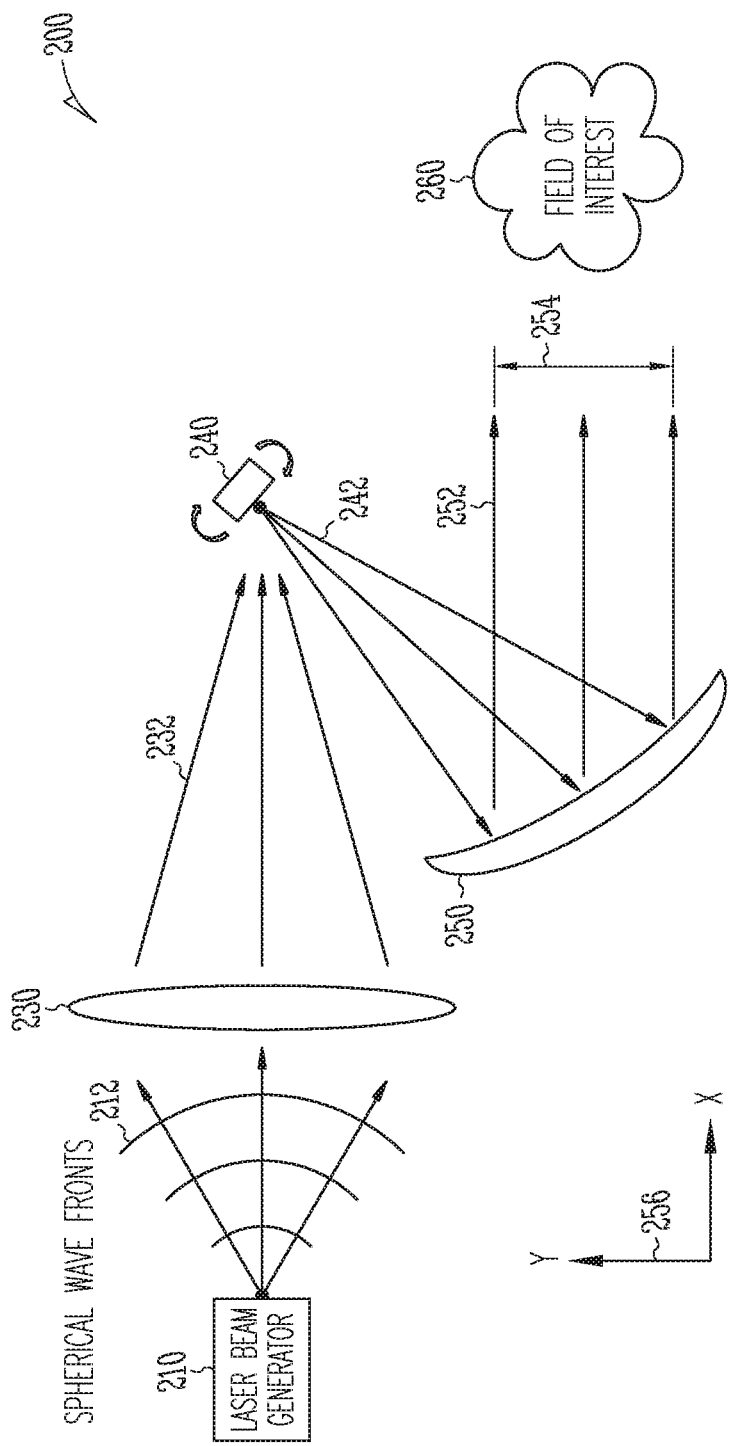
FIG. 2 is a block diagram of an example of a laser steering sub-system for a LIDAR device, in accordance with various embodiments.

FIG. 2 is a block diagram of an example of a laser steering sub-system 200 of a LIDAR device, in accordance with various embodiments. Specifically, FIG. 2 depicts the laser steering portion of the LIDAR system and for brevity excludes discussion of the laser driving or signal detection portions of the LIDAR system. The laser steering sub-system 200 of a LIDAR device includes a laser beam generator 210, a focus element 230, a laser scanner 240, and a collimator device 250. The laser steering sub-system 200 of a LIDAR device is configured to scan a field of interest 260 which may include one or more objects. For example, the laser steering sub-system 200 may determine a distance to one or more of the objects in the field of interest 260 based on a reflection of laser beams that bounce off of the one or more objects in the field of interest 260.

In an embodiment, the laser beam generator 210 is configured to generate and emit light that results in a plurality of non-parallel laser beam waves 212. The laser beam waves 212 may diverge in a spherical manner. The non-parallel laser beam waves 212 are directed to a focus element 230.

The focus element 230 includes one or more lenses and/or mirrors. The focus element 230 is configured to change a direction of the non-parallel laser beam waves 212 to converge at the laser beam scanner 240. Specifically, the focus element 230 is positioned between the laser beam generator 210 and the laser beam scanner 240 such that the non-parallel laser beam waves 232 that pass through focus element 230 converge at the laser beam scanner 240. In an embodiment, the focus element 230 is configured to change a direction of diverging beams to converging beams.

The laser beam scanner 240 reflects the beams 232 towards the collimator device 250. The laser beam scanner 240 includes one or more mirrors and rotates about its central axis to reflect the beams 232 towards different portions of the collimator device 250. Specifically, the laser beam scanner 240 reflects beams 232 that it receives from the focus element 230 as diverging beams 242 towards the collimator device 250.

Collimator device 250 includes one or more lenses, mirrors, and/or active circuitry for converting or collimating the beams 242 the collimator device 250 receives into parallel beams 252. Namely, the collimator device 250 changes a direction of each diverging beam 242 it receives into a parallel path towards the field of interest 260. Each beam reflected by the collimator device 250 towards the field of interest 260 travels along the same direction. This results in a collection of beams 252 having a specified width 254.

In an embodiment, as the laser beam scanner 240 rotates about its central axis, the collection of beams 252 are raised or lowered along the vertical y-axis 256 but continue traveling along the same parallel direction. As an example, when the laser beam scanner 240 rotates clockwise by a specified number of degrees, the collection of beams 252 are raised (along the y-axis 256) by a specified distance. When the laser beam scanner 240 rotates counterclockwise by a specified number of degrees, the collection of beams 252 are lowered (along the y-axis 256) by a specified distance. In this way, different portions of one or more objects in the field of interest 260 can be scanned by the laser steering sub-system 200 of a LIDAR device.

In some embodiments, the width 254 of the beams 252 is controlled or set based on a relative position or distance between the collimator device 250 and the laser beam scanner 240. In an example, as the distance between the collimator device 250 and the laser beam scanner 240 increases, the width 254 of the beams 252 also increases. In an embodiment, as the distance between the collimator device 250 and the laser beam scanner 240 increases to increase the width 254, a size of the collimator device 250 may need to be increased to capture a substantial portion of the beams 242. While increasing the size of collimator device 250 increases the physical space occupied by the laser steering sub-system 200 of a LIDAR device, the overall power consumption and scanning speed of the laser steering sub-system 200 of a LIDAR device remains constant. This is because the collimator device 250 is stationary (fixed) and does not need to be rotated or moved during scanning. In this way, unlike the prior techniques that require the size of the laser beam scanner 240 to be increased when the width 254 of the beam is increased which reduces scanning speed and increases power consumption, according to the disclosed embodiments, the size of the laser beam scanner 240 remains the same while the width 254 of the beam 252 is increased.

According to some embodiments, the width 254 of the beams 525 is increased without increasing the size of the laser beam scanner 240. In this way, the disclosed techniques allow the physical space on a device to be reduced while still providing increased spatial resolution and high signal to noise ratio when scanning objects with cross sections smaller than the beam size. Also, by employing smaller scale laser beam scanners 240 while increasing the width 254 of the beams 252, the laser beam scanner 240 can be rotated significantly faster while consuming less power. This allows objects with cross sections smaller than the beam size to be detected, measured and scanned by the laser steering sub-system 200 of a LIDAR device which improves the spatial and angular resolution of the laser steering sub-system 200 of a LIDAR device.

In some embodiments, collimator device 250 includes a deformable mirror array. Such a mirror array can be dynamically controlled as the laser beam scanner 240 rotates to keep the beams 252 parallel and with a constant width 254.

In some embodiments, collimator device 250 includes an array of parabolic reflectors. Such an array of parabolic reflectors can be dynamically controlled as the laser beam scanner 240 rotates to keep the beams 252 parallel and with a constant width 254.

In some embodiments, collimator device 250 includes a suitable material (such as phase modulation materials and electrode arrays) that can change a phase and direction of beams 242 from diverging in different directions to being parallel.

Figure 3:
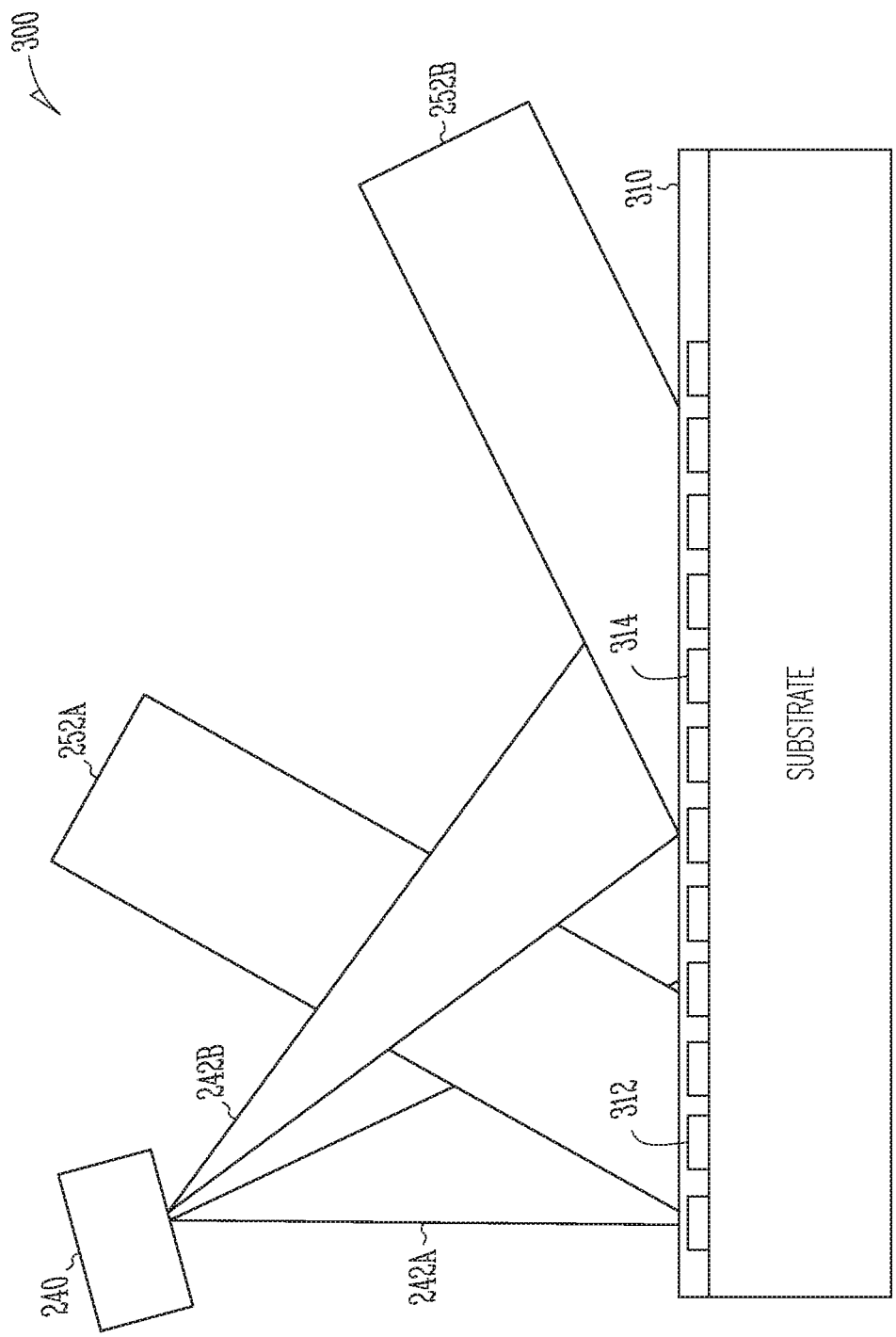
FIG. 3 is a block diagram of an example of a laser steering sub-system for a LIDAR device with a collimator device, in accordance with various embodiments.

FIG. 3 is a block diagram of an example of a laser steering sub-system 300 with a collimator device 250, in accordance with various embodiments. Specifically, the laser steering sub-system 300 of a LIDAR device includes all of the same components and configuration as the laser steering sub-system 200 (FIG. 2) but illustrates use of an active component 310 as the collimator device 250. As shown, the laser beam scanner 240 reflects a first collection of divergent beams 242A towards the active component 310. The active component 310 redirects and reorients the first collection of divergent beams 242A as a first collection of parallel beams 252A. At a later time, the laser beam scanner 240 rotates and reflects a second collection of divergent beams 242B towards the active component 310. The active component 310 redirects and reorients the second collection of divergent beams 242B as a second collection of parallel beams 252B.

In an embodiment, the active component 310 includes a substrate, phase modulation material and electrodes. The phase modulation material and electrodes control the phase of the beams 242 received by the active component 310 to change the direction of the beams to be parallel. As the laser beam scanner 240 rotates, different sets of the electrodes are activated to change the phase of the beams 242.

For example, when the first collection of divergent beams 242A is received by the active component 310, a first set of electrodes 312 is activated and used to change the direction of the first collection of divergent beams 242A. When the second collection of divergent beams 242B is received by the active component 310, a second set of electrodes 314 is activated and used to change the direction of the second collection of divergent beams 242B. In some implementations, the second collection of divergent beams 242B is wider than the first collection of divergent beams 242A. This may be because the portion of the active component 310 reached by the second collection of divergent beams 242B is further away from laser beam scanner 240 than the portion of the active component 310 reached by the first collection of divergent beams 242A. In such cases, the second set of electrodes 314 includes a greater number of electrodes than the first set of electrodes 312.

Figure 4:
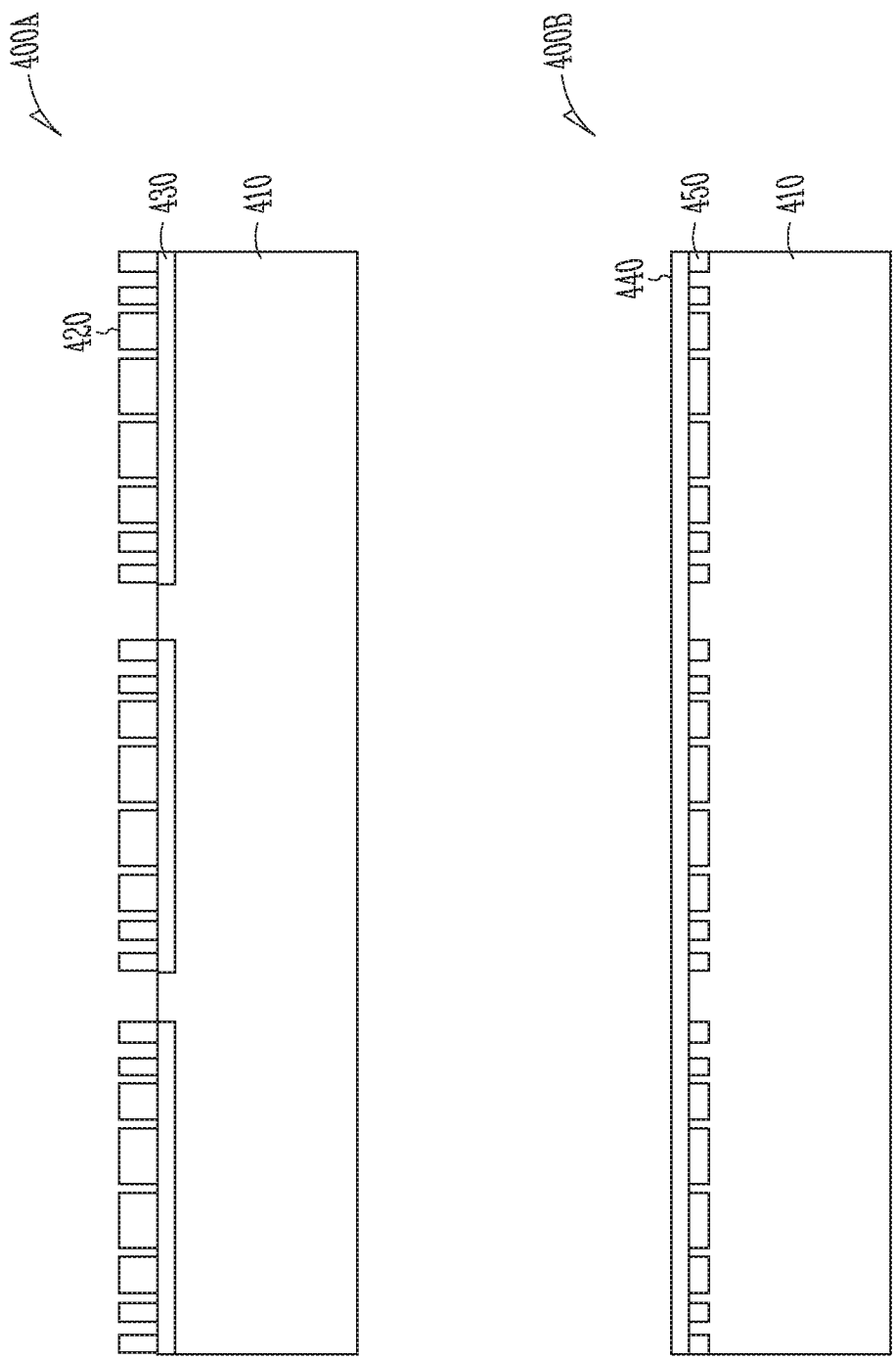
FIG. 4 is a block diagram of examples of collimator devices, in accordance with various embodiments.

FIG. 4 is a block diagram of examples of collimator devices, in accordance with various embodiments. First collimator device 400A represents a first implementation of the active component 310 (FIG. 3). Second collimator device 400B represents a second implementation of the active component 310 (FIG. 3).

First collimator device 400A includes a phase changing meta surface 420, a plurality of electrodes 430 and a substrate 410. The first collimator device 400A changes a phase or direction of a collection of received beams based on a pattern of the phase changing meta surface 420. In this case, the first collimator device 400A divides the phase changing meta surface 420 into a plurality of regions where each region includes a different pattern or the same pattern of the phase changing meta surface 420. The electrodes 430 are grouped under each region of the phase changing meta surface 420. A refractive index of the different regions of the phase changing meta surface 420 is changed using the electrodes 430. By changing the refractive index of the different regions of the phase changing meta surface 420, the phase and direction of the light received by a given region of phase changing meta surface 420 is changed. In an embodiment, the phase and direction of the light is changed such that all of the light reflected by the first collimator device 400A is parallel.

As light is received by a given region of phase changing meta surface 420, the phase and direction of the light is changed based on the pattern of the phase changing meta surface 420. The pattern of the phase changing meta surface 420 is configured and set based on a position and orientation of the collimator device 250 (or active component 310) relative to the laser beam scanner 240. As the laser beam scanner 240 rotates, the first collimator device 400A activates different regions of the phase changing meta surface 420 to keep the beams reflected by the first collimator device 400A parallel. In this way, the first collimator device 400A is synchronized with the laser beam scanner 240.

Second collimator device 400B includes a phase changing layer (or meta surface) 440, a plurality of electrodes 450 and a substrate 410. The second collimator device 400B changes a phase or direction of a collection of received beams based on a pattern of the electrodes 450. In this case, the second collimator device 400B divides the electrodes 450 into a plurality of regions where each region includes a different pattern or the same pattern of the electrodes 450. Overlaying the electrodes 450 is a continuous layer of the phase changing layer 440. A refractive index of different regions of the phase changing layer 440 is changed using the different regions of electrodes 430. By changing the refractive index of the different regions of the phase changing meta surface 420, the phase and direction of the light received by a given region of phase changing meta surface 420 is changed. In an embodiment, the phase and direction of the light is changed such that all of the light reflected by the first collimator device 400A is parallel.

As light is received by a given region of phase changing layer 440, the phase and direction of the light is changed based on the pattern of the electrodes 450 under the phase changing layer 440. The pattern of the electrodes 450 is configured and set based on a position and orientation of the collimator device 250 (or active component 310) relative to the laser beam scanner 240. As the laser beam scanner 240 rotates, the second collimator device 400B activates different regions of the electrodes 450 to change the refractive index of the corresponding layer of the phase changing layer 440 that overlays the activated regions of the electrodes 450 to keep the beams reflected by the first collimator device 400A parallel. In this way, the first collimator device 400A is synchronized with the laser beam scanner 240.

Figure 5:
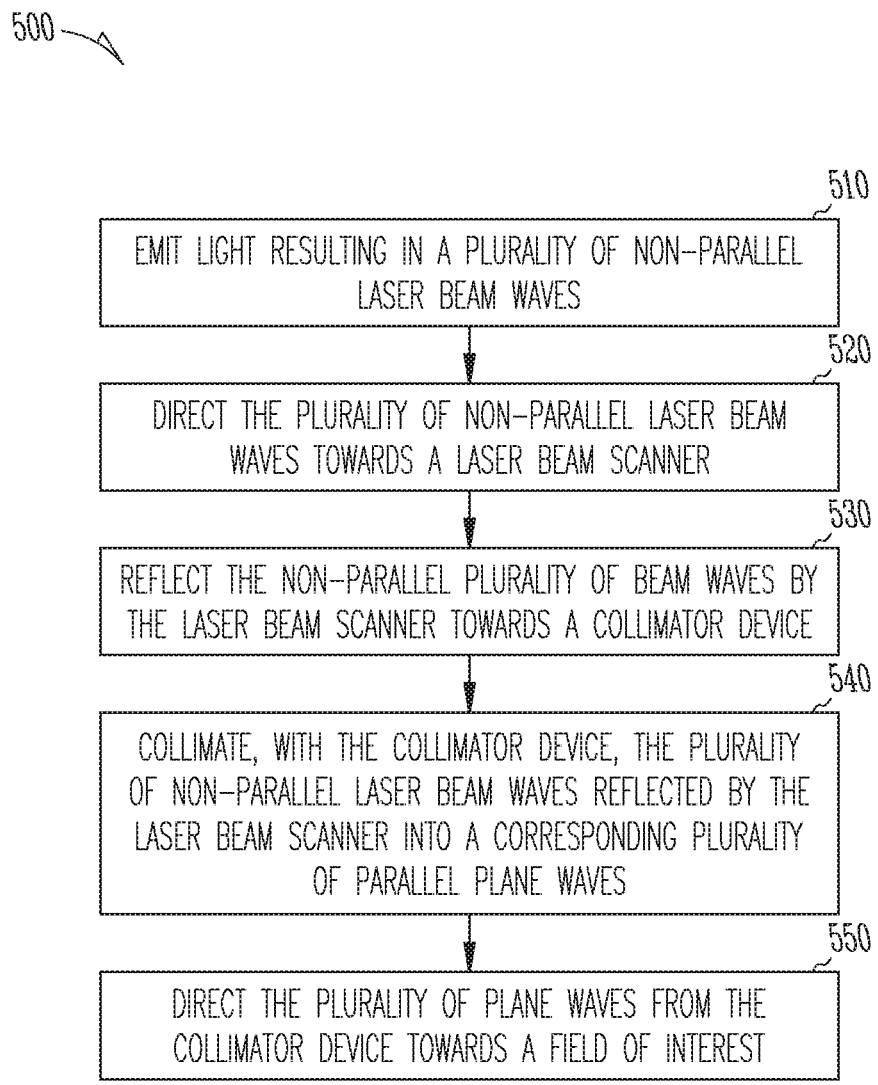
FIG. 5 is a flow diagram depicting an example process for operating a laser steering sub-system for a LIDAR device, in accordance with various embodiments.

FIG. 5 is a flow diagram depicting an example process 500 for operating a the laser steering sub-system 200 of a LIDAR device, in accordance with various embodiments.

At operation 510, the laser steering sub-system 200 emits light resulting in a plurality of non-parallel laser beam waves 232.

At operation 520, the laser steering sub-system 200 directs the plurality of non-parallel laser beam 232 waves towards a laser beam scanner 240.

At operation 530, the laser steering sub-system 200 reflects the non-parallel plurality of beam waves by the laser beam scanner 240 towards a collimator device 400.

At operation 540, the laser steering sub-system 200 collimates, with the collimator device 400, the plurality of non-parallel laser beam waves 232 reflected by the laser beam scanner 240 into a corresponding plurality of parallel plane waves.

At operation 550, the laser steering sub-system 200 directs the plurality of plane waves from the collimator device 400 towards a field of interest 260.

Figure 6:
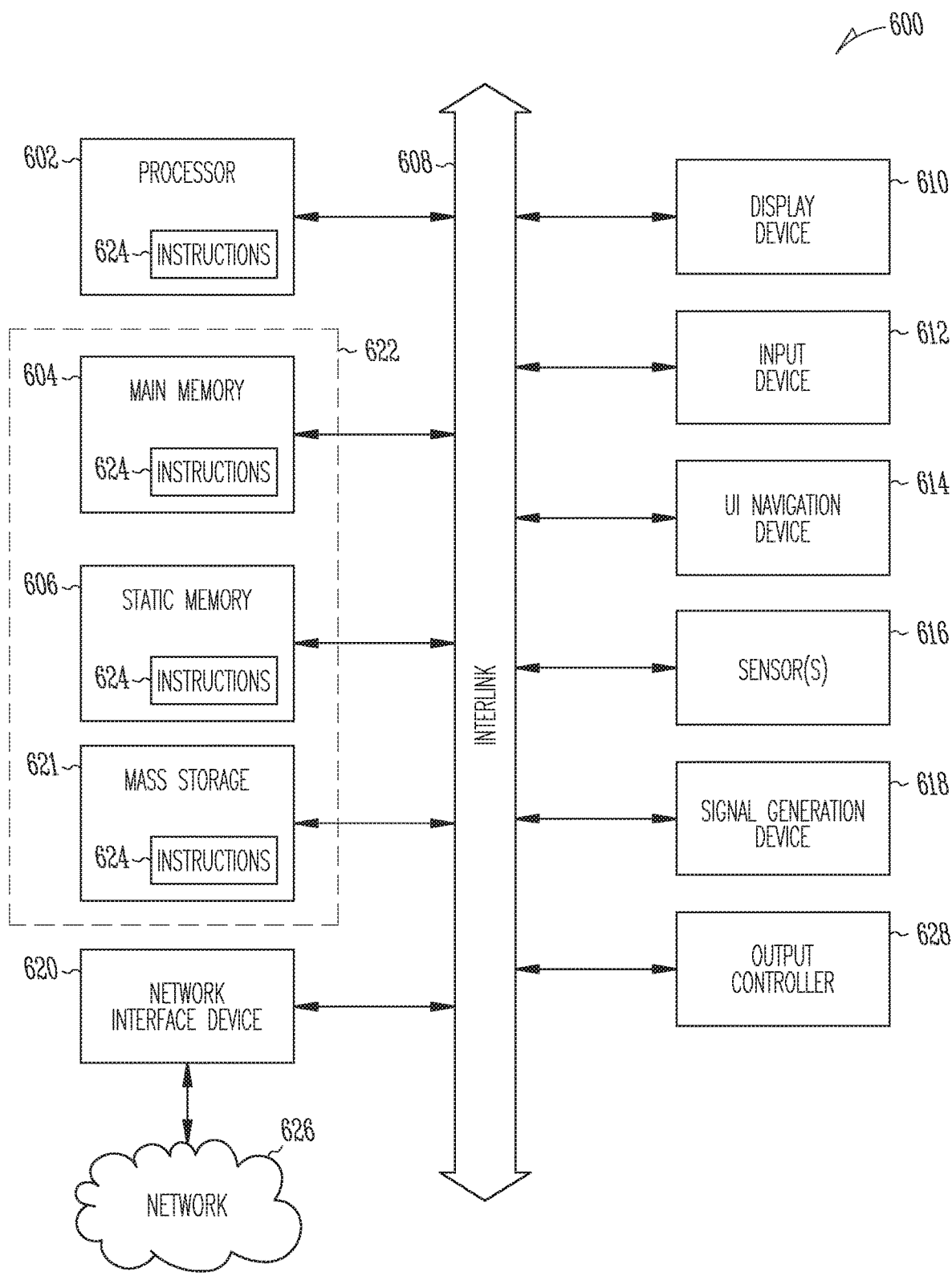
FIG. 6 is a block diagram illustrating an example of a machine upon which one or more embodiments may be implemented.

FIG. 6 is a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. The machine 600 may be a personal computer (PC), a tablet PC, a set-top box (STB), a personal digital assistant (PDA), a mobile telephone, a web appliance, an IOT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example; under operation, execution units may be used in a first circuit of a first circuitry at one point in time and reused by a second circuit in the first circuitry, or by a third circuit in a second circuitry, at a different time.

The machine (e.g., computer system) 600 may include a hardware processor 602 (e.g., a central processing unit (CPU), a graphics processing unit (GPU), a hardware processor core, or any combination thereof, such as a memory controller, etc.), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse). In an example, the display device 610, alphanumeric input device 612, and UI navigation device 614 may be a touchscreen display. The machine 600 may additionally include a storage device 622 (e.g., drive unit); a signal generation device 618 (e.g., a speaker); a network interface device 620; one or more sensors 616, such as a Global Positioning System (GPS) sensor, wing sensors, mechanical device sensors, temperature sensors, sensors, bridge sensors, audio sensors, industrial sensors, a compass, an accelerometer, or other sensors. The machine 600 may include an output controller 628, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 622 may include a machine-readable medium on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 621 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 624.

The term "machine-readable medium" may include any transitory or non-transitory medium that is capable of storing, encoding, or carrying transitory or non-transitory instructions 624 for execution by the machine 600 and that cause the machine 600 to perform any one or more of the techniques of the present disclosure, or that is capable of storing, encoding, or carrying data structures used by or associated with such instructions 624. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

The instructions 624 (e.g., software, programs, an operating system (OS), etc.) or other data that are stored on the storage device 621 can be accessed by the main memory 604 for use by the hardware processor 602. The main memory 604 (e.g., DRAM) is typically fast, but volatile, and thus a different type of storage from the storage device 621 (e.g., an SSD), which is suitable for long-term storage, including while in an "off" condition. The instructions 624 or data in use by a user or the machine 600 are typically loaded in the main memory 604 for use by the hardware processor 602. When the main memory 604 is full, virtual space from the storage device 621 can be allocated to supplement the main memory 604; however, because the storage device 621 is typically slower than the main memory 604, and write speeds are typically at least twice as slow as read speeds, use of virtual memory can greatly reduce user experience due to storage device latency (in contrast to the main memory 604, e.g., DRAM). Further, use of the storage device 621 for virtual memory can greatly reduce the usable lifespan of the storage device 621.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO)), or multiple-input single-output (MISO) techniques. The term "transmission medium" shall be taken to include any tangible or intangible medium that is capable of storing, encoding, or carrying instructions 624 for execution by the machine 600, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc., are used merely as labels, and are not intended to impose numerical requirements on their objects.

Method examples described herein may be machine- or computer-implemented, at least in part. Some examples may include a computer-readable medium or machine-readable medium encoded with transitory or non-transitory instructions 624 operable to configure an electronic device to perform methods as described in the above examples. An implementation of such methods may include code, such as microcode, assembly-language code, a higher-level-language code, or the like. Such code may include transitory or non-transitory computer-readable instructions 624 for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled,

What is claimed is:

1. A lidar device comprising:
  a laser beam source configured to emit light resulting in a plurality of non-parallel laser beam waves;
  a laser beam scanner; and
  one or more lenses configured to direct the plurality of non-parallel laser beam waves towards the laser beam scanner, the laser beam scanner being configured to reflect the non-parallel plurality of beam waves towards a collimator device;
  the collimator device being configured to:
  collimate the plurality of non-parallel laser beam waves reflected by the laser beam scanner into a corresponding plurality of parallel plane waves; and
  direct the plurality of plane waves comprising a beam width towards a field of interest, wherein the beam width is set based on a relative distance between the collimator device and the laser beam scanner.

2. The lidar device of claim 1, wherein the plurality of non-parallel laser beam waves are spherical waves.

3. The lidar device of claim 2, wherein the plurality of non-parallel laser beam waves directed by the one or more lenses converge at different angles at the laser beam scanner.

4. The lidar device of claim 1, wherein the laser beam scanner is configured to linearly phase shift the plurality of non-parallel laser beam waves by rotating about an axis of the laser beam scanner.

5. The lidar device of claim 4, wherein the collimator device comprises a fixed array of parabolic reflectors with each reflector configured to collimate the laser beam toward one of a plurality of directions.

6. The lidar device of claim 4, wherein the collimator device is actively synchronized with the laser beam scanner by changing operation of the collimator device as the laser beam scanner rotates about the axis of the laser beam scanner.

7. The lidar device of claim 6, wherein the collimator device comprises an active phase change device comprising a plurality of phase change devices, wherein different sets of the phase change devices are activated to change a refractive index of the phase change devices as the laser beam scanner rotates about the axis of the laser beam scanner so as to collimate the linearly phase shifted plurality of non-parallel laser beam waves into the corresponding plurality of parallel plane waves, wherein the refractive index of the different sets of the phase change devices is changed using a plurality of electrodes.

8. The lidar device of claim 6, wherein the collimator device comprises an active phase change device comprising a layer of phase-change material (PCM) and a plurality of electrodes, wherein different sets of the electrodes are activated as the laser beam scanner rotates about the axis of the laser beam scanner so as to collimate the linearly phase shifted plurality of non-parallel laser beam waves into the corresponding plurality of parallel plane waves.

9. The lidar device of claim 6, wherein the collimator device comprises a bendable mirror that actively bends as the laser beam scanner rotates about the axis of the laser beam scanner so as to collimate the linearly phase shifted plurality of non-parallel laser beam waves into the corresponding plurality of parallel plane waves.

10. A method for operating a lidar device, the method comprising:
   emitting light resulting in a plurality of non-parallel laser beam waves;
   directing the plurality of non-parallel laser beam waves towards a laser beam scanner;
   reflecting the non-parallel plurality of beam waves by the laser beam scanner towards a collimator device;
   collimating, with the collimator device, the plurality of non-parallel laser beam waves reflected by the laser beam scanner into a corresponding plurality of parallel plane waves; and
   directing the plurality of plane waves comprising a beam width from the collimator device towards a field of interest, wherein the beam width is set based on a relative distance between the collimator device and the laser beam scanner.

11. The method of claim 10, wherein an individual parallel plane wave of the plurality of parallel plane waves originates from a point on the collimator device where an individual one of the plurality of non-parallel laser beam waves is received by the collimator device.

12. The method of claim 10, wherein the laser beam scanner is configured to linearly phase shift the plurality of non-parallel laser beam waves by rotating about an axis of the laser beam scanner.

13. The method of claim 12, wherein the collimator device comprises a fixed array of parabolic reflectors with each reflector configured to collimate the laser beam toward one of a plurality of directions.

14. The method of claim 12, further comprising actively synchronizing the collimator device with the laser beam scanner by changing operation of the collimator device as the laser beam scanner rotates about the axis of the laser beam scanner.

15. The method of claim 14, wherein the collimator device comprises an active phase change device comprising a plurality of phase change devices, further comprising activating different sets of the phase change devices to change a refractive index of the phase change devices as the laser beam scanner rotates about the axis of the laser beam scanner so as to collimate the linearly phase shifted plurality of non-parallel laser beam waves into the corresponding plurality of parallel plane waves, wherein the refractive index of the different sets of the phase change devices is changed using a plurality of electrodes.

16. A lidar device apparatus comprising:
   means for emitting light resulting in a plurality of non-parallel laser beam waves;
   means for directing the plurality of non-parallel laser beam waves towards a laser beam scanner;
   means for reflecting the non-parallel plurality of beam waves by the laser beam scanner towards a collimator device;
   means for collimating, with the collimator device, the plurality of non-parallel laser beam waves reflected by the laser beam scanner into a corresponding plurality of parallel plane waves; and
   means for directing the plurality of plane waves comprising a beam width from the collimator device towards a field of interest, wherein the beam width is set based on a relative distance between the collimator device and the laser beam scanner.

17. The lidar device apparatus of claim 16, wherein the collimator device comprises an active phase change device comprising a plurality of phase change devices, wherein different sets of the phase change devices are activated to change a refractive index of the phase change devices as the laser beam scanner rotates about an axis of the laser beam scanner so as to collimate the plurality of non-parallel laser beam waves into the corresponding plurality of parallel plane waves, wherein the refractive index of the different sets of the phase change devices is changed using a plurality of electrodes.

18. The lidar device apparatus of claim 17, wherein the beam width remains constant as the laser beam scanner rotates about an axis of the laser beam scanner.

19. The lidar device apparatus of claim 16, wherein the plurality of non-parallel laser beam waves converge at different angles at the laser beam scanner.

20. The lidar device apparatus of claim 16, wherein the laser beam scanner is configured to linearly phase shift the plurality of non-parallel laser beam waves by rotating about an axis of the laser beam scanner.

* * * * *